US006585891B1

(12) United States Patent
Ohkawa

(10) Patent No.: US 6,585,891 B1
(45) Date of Patent: Jul. 1, 2003

(54) PLASMA MASS SEPARATOR USING PONDEROMOTIVE FORCES

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 10/086,671

(22) Filed: Feb. 28, 2002

(51) Int. Cl.[7] ............................ B03C 1/00; B01J 19/08

(52) U.S. Cl. ...................... 210/222; 210/243; 210/748; 422/186.01; 422/186.02; 250/281; 209/12.1; 209/727; 204/155

(58) Field of Search ................................ 210/222, 243, 210/695, 748; 422/186.01, 186.03, 906; 209/12.1, 227; 204/155; 250/281, 282

(56) References Cited

U.S. PATENT DOCUMENTS

| | | |
|---|---|---|
| 5,681,434 A | 10/1997 | Eastlund |
| 5,868,909 A | 2/1999 | Eastlund |
| 5,939,029 A | 8/1999 | Ohkawa |
| 6,096,220 A | 8/2000 | Ohkawa |

OTHER PUBLICATIONS

Bittencourt, J.A., and Ludwig, G.O.; *Steady State Behavior of Rotating Plasmas in a Vacuum–Arc Centrifuge; Plasma Physics and Controlled Fusion*, vol. 29, No. 5, pp. 601–620; Great Britain, 1987.

*Primary Examiner*—David A. Reifsnyder
(74) *Attorney, Agent, or Firm*—Nydegger & Associates

(57) ABSTRACT

A device for separating high-mass ions (having cyclotron frequency $\Omega_h$) from low-mass ions (having cyclotron frequency $\Omega_l$) in a plasma includes a chamber. Coils are provided to generate a substantially uniform magnetic field in the chamber. An antenna is provided to launch a left-hand elliptically polarized electromagnetic wave into the chamber along the stationary magnetic field that is evanescent in the multi-species plasma. Importantly, the E vector of the elliptically polarized electromagnetic wave rotates at a frequency, ω, where $\Omega_h<\omega<\Omega_l$. Ponderomotive forces are generated by the electromagnetic wave that cause the low-mass ions to move toward the antenna while causing the high-mass ions to move away from the antenna.

13 Claims, 1 Drawing Sheet

PLASMA MASS SEPARATOR USING PONDEROMOTIVE FORCES

FIELD OF THE INVENTION

The present invention pertains generally to plasma apparatus and processes for use in material separation applications. More particularly, the present invention pertains to apparatus which are capable of separating ions in a plasma according to their respective mass to charge ratio. The present invention is particularly, but not exclusively, useful for separating ions in a plasma according to their respective mass to charge ratios using ponderomotive forces.

BACKGROUND OF THE INVENTION

For applications wherein the purpose is to separate one constituent element from a multi-constituent material, such as a chemical mixture of elements or isotopes, there are several possible ways to proceed. In some instances, mechanical separation may be possible. In others, chemical separation may be more appropriate. When mechanical or chemical processes are not feasible, however, it may happen that separation procedures and processes involving plasma physics may be necessary. To do this, a multi-species plasma needs to be made from the chemical mixture and the resultant ions separated according to their respective mass to charge ratios.

Ion separation can be accomplished in several ways known in the pertinent art. For example, plasma centrifuges and their methods of operation are well known. On the other hand, and not yet so well known, plasma filters and their methods of operation are also useful for this purpose. For example, the invention as disclosed by Ohkawa in U.S. Pat. No. 6,096,220 which issued on Aug. 1, 2000, for an invention entitled "Plasma Mass Filter" and which is assigned to the same assignee as the present invention, is useful for separating ions of different mass to charge ratios. Quite different from the above described techniques, the present invention contemplates the use of ponderomotive forces to separate ions in a multi-species plasma according to their mass to charge ratios.

It is well known that photons carry momentum. When a wave of photons (i.e. an electromagnetic wave) is evanescent in a medium, reflection of the wave occurs. When a photon is reflected from a media, momentum is transferred from the photon to the medium. Importantly, this momentum transfer exerts a force (a ponderomotive force) on the medium. In the case where the medium is a plasma, a force is exerted on the individual particles (ions and electrons) in the plasma. Along these lines, co-pending application Ser. No. 10/086,575 entitled "Ponderomotive Force End Plug For A Plasma Mass Filter" by Tihiro Ohkawa filed concurrently herewith now allowed and which is assigned to the same assignee as the present invention, discloses the use of ponderomotive forces to create an end plug for a plasma chamber. The contents of the co-pending allowed application entitled "Ponderomotive Force End Plug For A Plasma Mass Filter" are hereby incorporated by reference.

In a uniform, stationary magnetic field, the ions and electrons in a plasma will rotate in oppositely directed orbits. If a circularly polarized electromagnetic wave is propagating in the direction of the magnetic field, two distinct polarization modes are possible for the electromagnetic wave; a right-hand polarized mode and a left-hand polarized mode. In the right-hand mode, the electric field of the electromagnetic wave rotates in the same direction as the gyration of the electrons in the stationary magnetic field. In contrast, in the left-hand mode, the electric field of the electromagnetic wave rotates in the opposite direction as the gyration of the electrons in the stationary magnetic field.

Importantly for the present application, a left-hand polarized mode electromagnetic wave having specifically tailored characteristics can impart ponderomotive forces on ions, the direction of which will vary depending on the mass to charge ratio of the ion. Stated differently, for a plasma that contains multiple species of ions, the low-mass ions with the cyclotron frequencies higher than the frequency of the left-hand polarized mode electromagnetic wave are forced to move in one direction while the electrons and the high-mass ions are forced to move in the opposite direction.

To make the plasma dielectric negative, the sum of the ponderomotive forces on all charged particles must be confining (i.e. directed away from the source of the electromagnetic wave). Since each species receives a different force, an electrostatic field build up occurs due to the ambipolar effect. The steady state can be calculated by starting with the contribution $\epsilon_s$ of a single charged particle to the plasma dielectric in the left-hand polarized mode, which is given by:

$$\epsilon_s=\{e^2/m\omega[-\Omega]\} \quad [1]$$

where m is the mass, ω is the wave frequency and ≠ is the cyclotron frequency of the charged particle including the sign. For convenience, the following convention is used; $\omega>0$, $\Omega_i>0$ and $\Omega_e<0$.

The ponderomotive force, f, on the particle is given by $$f=\{e^2/m\omega[-\omega+\Omega]\}[½][\nabla E^2] \quad [2]$$

where E is the electric field of the wave. The sign (i.e. direction) of the ponderomotive force is directly related to the sign of the dielectric contribution. The ponderomotive potential U can be defined by $$U=\{e^2/m\omega[-\omega+\Omega]\}[E^2/2]. \quad [3]$$

The force balance equations for the electrons and the ions are given by $$-\nabla p_e-n_e\nabla U_e+e\ n_e\nabla\Phi=0$$

and $$-\nabla p_i-n_i\nabla U_i-e\ n_i\nabla\Phi=0 \quad [4]$$

where p is the pressure and Φ is the electrostatic potential.

Consider now a plasma with two ion species [subscript 1 and 2]. By assuming equal and uniform temperature T, the following equations are obtained:

$$\nabla\{-T\ In\ n_e-U_e+e\Phi\}=0$$

$$\nabla\{-T\ In\ n_{1,2}-U_{1,2}-e\Phi\}=0 \quad [5]$$

$$n_1+n_2=n_e.$$

By eliminating Φ, the following equations are obtained:

$$n_1^2=\{n_{1,0}^2n_e\exp[[U_2-2U_1-U_e]/T]\{\}n_{2,0}+n_{1,0}\exp[U_2-U_1]/T\}^{-1}$$

$$n_2^2=\{n_{2,0}^2n_e\ \exp[[U_2-U_e]/T]\{\}n_{2,0}+n_{1,0}\exp[U_2-U_1]/T\}^{-1} \quad [6]$$

where the subscript 0 denotes the quantities away from the source of the electromagnetic wave.

The ratio of the densities is given by $$n_2/n_1=[n_{20}/n_{10}]\exp[-U_2+U_1]/T \quad [7]$$

and $$[-U_2+U_1]/T=\{e^2E^2/T\omega[\Omega_2-\Omega_1]\}[M_1^{-1}+M_2^{-1}]. \quad [8]$$

Thus, the concentration of the low-mass ions, $M_1$, increases away from the source of the electromagnetic wave.

Since the low-mass ions are not confined, the above equilibrium is fictitious. The equation for the low-mass ions should contain the velocity term $$-\nabla p_2-\nabla\{M_2v_2^2/2+U_2+e\Phi\}=0. \quad [9]$$

The uniform temperature assumption may not be correct but it can be used to see a trend, namely $$\nabla[T\, In\, n_2+M_2v_2^2/2+U_2+e\Phi]=0. \quad [10]$$

The above equation is the same as eq. [5] if $U_2$ is replaced by $U_2+M_2\,v_2^2/2$. The solution given by eq. [6] holds with the substitution. The solution is made self consistent with $$n_2\,v_2=\Gamma_2=\text{const.}$$

If the magnitude of the ponderomotive potentials for the electrons and the ions are comparable, eq. [10] shows that the unconfined ions stream out at the sound velocity.

Useful results can be obtained by using the concentration ratio given by eq [7]. The optimum frequency is given by $$\omega=[\Omega_1+\Omega_2]/2 \quad [11]$$

and $$[U_1-U_2]/T=\{2E^2M_1M_2/B_0^2[M_1-M_2]T\}. \quad [12]$$

The required field is small for a mass difference that is small, such as isotopes. However, the density limit resulting from the ion-ion collisions is lower.

The dispersion equation is given by $$k^2=[\omega^2/c^2]\{1+\Sigma\omega_p^2/\omega[-\omega+\Omega]\}-\lambda^2 \quad [13]$$

where k is the axial wave number, X is the radial wave number, $\omega_p^2=e^2\,n_j/\epsilon_0\,M_j$, and $\Sigma$ is the sum over all species. It is important to keep the wave evanescent, and the concentration of the low-mass ions is limited by this condition. For the choice of the frequency given by eq [11], the limit is $n_2<n_e/2$ in the limit of $\lambda=0$.

For steady state bulk separation where the goal is to produce low-mass ions, the first end of the separator is plugged and contains the electromagnetic wave source. The second end is open. The first end receives one half of the low-mass ions and no high-mass ions. The second end receives all of the high-mass ions and one half of the low-mass ions. If the desired product is the high-mass ions, the second end is opened periodically. While the second end is plugged, the first end receives almost all low-mass ions. The second end can be opened to allow all of the remaining ions to exit the second end. The cycle is repeated until the desired purity of high-mass ions is obtained.

The separation throughput is also limited by collisional effects. Both electron and ion collisions dissipate the power of the electromagnetic wave. At some point the dissipation becomes so great that the ponderomotive force is ineffective. Also, the ion collisions blur the difference between the ion cyclotron frequencies among the different ion species. This is especially true for the isotope separation where the difference between the isotopes is small.

Consider now the motion of a charged particle with charge, q, and mass, M, under the electric field given by $$E_x+iE_y=E\exp[-i\omega t+kz]. \quad [14a]$$

The magnetic field is given by $$B_x+iB_y=[\omega/k]E\exp[-i\omega t+kz]. \quad [14b]$$

The equation of motion becomes $$Mdv_x/dt=qE_x+qv_yB_0$$

$$Mdv_y/dt=qE_y-qv_xB_0$$

$$Mdv_z/dt=F_z=q[v_xB_y-v_yB_x]. \quad [14c]$$

from which the following relationships are obtained:

$$v_x+iv_y=-i[q/M][-\omega+\Omega]^{-1}E\exp[-\omega t+kz]. \quad [14d]$$

When the collision frequency is included in eq. [14d], the result is $$v_x+iv_y=e[E_x+iE_y]/\{m[i\omega-i\Omega+\nu]\}. \quad [14e]$$

The power dissipation P for each species is given by $$P=enRe[v_x-iv_y][E_x+E_y] \quad [15]$$

$$=[e^2n/m]\nu E^2/\{[\omega-\Omega]^2+\nu^2\}. \quad [16]$$

By relating the power to the ponderomotive potential, the result is $$P=2\nu\omega[\omega-\Omega]\{[\omega-\Omega]^2+\nu^2\}^{-1}n\,U. \quad [17]$$

For electrons, $\omega<<|\Omega|$ and $\nu_e<<\Omega_e$, $$P_e\approx 2\,\nu_e[\omega/\Omega_e]n_e\,U_e. \quad [18]$$

For the ions, assuming $\nu_i<<|\omega-\Omega_i|$ the result is $$P_i\approx 2\,\nu_i[\omega/|\omega-\Omega_i|]n_i\,U_i. \quad [19]$$

The dissipation on the ions is much greater than that on the electrons. The overall ion dissipation is minimized, however, if the frequency, ω, is closer to the cyclotron frequency, Ω, of the minority low-mass ions. The power is proportional to the square of the density and −½ power of the temperature. A density of $10^{18}$ $m^{-1}$ at a few eV temperature is reachable with a reasonable power.

One application of the present invention is isotope separation where the lighter isotope is minority and useful. Examples include lithium, boron, palladium and uranium. Furthermore, the methods of the present invention are more efficient than methods such as Dawson's cyclotron resonance method in that the collector is not in the stream of the high-mass ions. Other applications for the separator include the separation of the fission products from the spent fuels (which consist mostly of TRU), and the separation of chemically similar elements.

In light of the above, it is an object of the present invention to provide devices and methods suitable for the purposes of efficiently separating a multi-constituent material into its individual constituents. It is another object of the present invention to provide methods for the separation of low-mass ions from high-mass ions in a multi-species plasma using ponderomotive forces. It is yet another object of the present invention to provide a device and method for the separation of low-mass ions from high-mass ions wherein the low-mass ion collector is not in the stream of the high-mass ions. Yet another object of the present invention is to provide a device and method for separating a material into its constituents which are easy to use, relatively simple to implement, and comparatively cost effective.

SUMMARY OF THE PREFERRED EMBODIMENTS

The present invention is directed to a device and method for separating a multi-constituent material into its individual constituents. To do this, the multi-constituent material is first converted into a multi-species plasma having ions of a relatively high-mass to charge ratio ($M_h$) and ions of a relatively low-mass to charge ratio ($M_l$). Specifically, this is done in a plasma chamber having two opposed ends which is provided to contain the multi-species plasma during separation. Further, the plasma chamber defines an axis extending through each end of the plasma chamber.

Coils are mounted on the outer surface of the plasma chamber to generate a substantially uniform magnetic field in the plasma chamber that is oriented parallel to the axis of the chamber. With this stationary magnetic field, moving ions with a relatively high-mass to charge ratio ($M_h$) will have a cyclotron frequency ($\Omega_h$) and moving ions with a relatively low-mass to charge ratio ($M_l$) will have a cyclotron frequency ($\Omega_l$).

The separation device of the present invention also includes an antenna for launching an electromagnetic wave into the plasma chamber that is evanescent in the multi-species plasma. Specifically, the antenna is positioned at one end of the plasma chamber to launch a wave into the plasma chamber through the chamber end. For the present invention, the electromagnetic wave is preferably elliptically polarized. As used here, the term "elliptically polarized electromagnetic wave" includes circularly polarized electromagnetic waves. Importantly, the E vector of the elliptically polarized electromagnetic wave rotates at a frequency, a, and is rotated in the direction opposite to the orbit of the electrons in the stationary magnetic field (i.e. a left-hand polarized mode).

To obtain ion separation in accordance with the present invention, ponderomotive forces are generated that cause the low-mass ions to move in one direction while causing the high-mass ions and electrons to move in the opposite direction. In accordance with the mathematical equations presented above, this is achieved by using an electromagnetic wave having a frequency, ω, where $\Omega_h<\omega<\Omega_l$. Once the frequency, ω, is established for the electromagnetic wave, a limit is placed on the density of light ions to ensure that the electromagnetic wave is evanescent in the multi-species plasma. For example, for a frequency, $\omega=\frac{1}{2}[\Omega_h+\Omega_l]$, the density of light ions in the multi-species plasma is controlled to be less that $n_e/2$, where ne is the density of electrons in the multi-species plasma. When collisional effects are anticipated (i.e. at high plasma densities), a frequency, ω, for the electromagnetic wave is chosen to be closer in magnitude to $\Omega_l$ than to $\Omega_h$ to avoid power dissipation in the wave.

BRIEF DESCRIPTION OF THE DRAWINGS

The novel features of this invention, as well as the invention itself, both as to its structure and its operation, will be best understood from the accompanying drawing, taken in conjunction with the accompanying description, in which similar reference characters refer to similar parts, and in which.

DESCRIPTION OF THE PREFERRED EMBODIMENT

Figure 1:
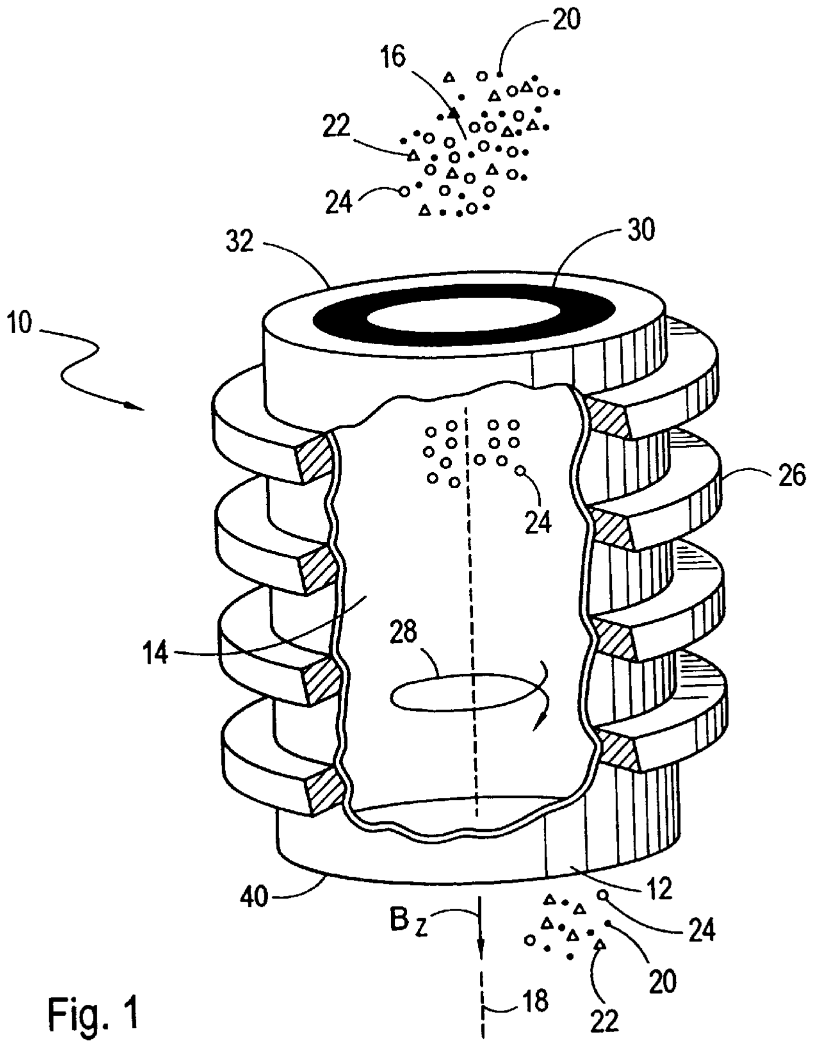
FIG. 1 is a perspective view of a separator in accordance with the present invention with portions of the separator wall removed for clarity.

Referring to FIG. 1, a separator in accordance with the present invention is shown and generally designated 10. As shown, the separator 10 includes a substantially cylindrical shaped wall 12 which surrounds a chamber 14 for holding a multi-species plasma 16, and defines a longitudinal axis 18. As further shown, the multi-species plasma 16 includes at least two ion species and electrons 20 that result from ionization. Among the ion species, the ions can be classified as either ions of relatively high-mass to charge ratio (hereinafter referred to as high-mass ions 22) or ions of relatively low-mass to charge ratio (hereinafter referred to as low-mass ions 24).

It is also shown in FIG. 1 that the separator 10 includes a plurality of magnetic coils 26 which are mounted on the outer surface of the wall 12 to surround the chamber 14. In a manner well known in the pertinent art, the coils 26 can be activated to create a stationary, uniform magnetic field in the chamber 14 which has a component B, that is directed substantially along the longitudinal axis 18. As is well known to the skilled artisan, magnetic fields cause moving charged particles (i.e. ions and electrons) to follow helical paths, such as the path 28 shown in FIG. 1. With this stationary magnetic field, $B_z$, moving ions with a relatively high-mass to charge ratio (high-mass ions 22) will have a cyclotron frequency ($\Omega_h$), moving ions with a relatively low-mass to charge ratio (low-mass ions 24) will have a cyclotron frequency ($\Omega_l$) and moving electrons 20 will have a cyclotron frequency ($\Omega_e$).

Additionally, as shown, the separator 10 includes an antenna 30 for launching an electromagnetic wave into the chamber 14 that is evanescent in the multi-species plasma 16. As shown the antenna 30 is positioned near the end 32 of the cylindrical shaped wall 12. Preferably, as shown, the antenna 30 is oriented at the end 32 of the wall 12 to launch an electromagnetic wave into the chamber 14 in a direction that is substantially parallel to the axis 18, and accordingly, in a direction substantially parallel to the stationary magnetic field. In order to generate the properly directed ponderomotive forces necessary to separate ions according to their respective mass to charge ratio, the antenna 30 is configured to launch an electromagnetic wave having specific characteristics.

In accordance with the present invention, the electromagnetic wave launched by the antenna 30 is preferably left-hand elliptically polarized. Although a single antenna 30 is shown in FIG. 1, it is to be appreciated that an electromagnetic wave having the specific characteristics described herein could also be created using a multi-element antenna, an antenna in combination with a mode converter, an antenna in combination with a wave guide (specifically it is contemplated that the wall 12 could function as a wave guide), or any other technique known in the pertinent art. Importantly, the E vector of the elliptically polarized electromagnetic wave rotates at a frequency, ω, in a direction opposite to the orbit direction of the electrons 20 in the stationary magnetic field.

Figure 2:
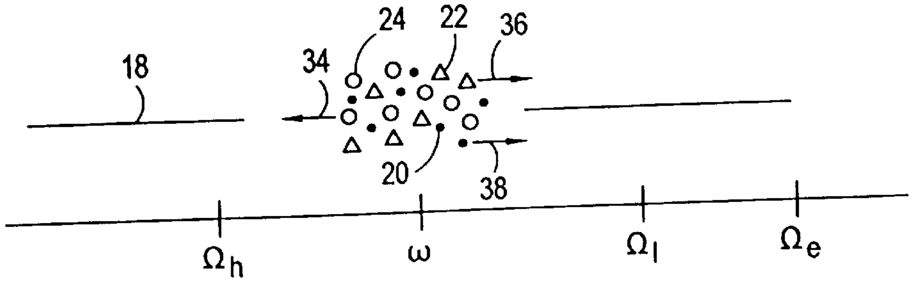
FIG. 2 is a schematic drawing, not to scale, showing the relative magnitudes of the cyclotron frequencies of the various plasma particles, and the frequency of the electromagnetic wave, and the ponderomotive force directions on the various particles.

As illustrated in FIG. 2, the frequency, ω, of the elliptically polarized electromagnetic wave is chosen to be between the cyclotron frequency of the high-mass ions 22 and the cyclotron frequency of the low-mass ions 24 (i.e. $\Omega_h<\omega<\Omega_l$). With this frequency, ω, specifically directed ponderomotive forces are imparted on the particles. Further, as illustrated in FIG. 2, the ponderomotive forces cause the low-mass ions 24 to move parallel to axis 18 in the direction indicated by arrow 34. On the other hand, the ponderomotive forces cause the high-mass ions 22 and electrons 20 to move parallel to axis 18 in the direction indicated by arrows 36 and 38.

Referring back to FIG. 1, in the operation of the separator 10 of the present invention, a multi-constituent material requiring separation into its constituents is first converted into a rotating multi-species plasma 16. This conversion is generally achieved through heating and ionization of the multi-constituent material. The rotation of the multi-species plasma 16 can be initiated using any technique known in the pertinent art. In accordance with the present invention, the conversion to a multi-species plasma 16 can take place in the chamber 14 or the multi-constituent material can be converted into a multi-species plasma 16 outside the chamber 14 for subsequent introduction into the chamber 14. For the present invention, the multi-constituent material can be any chemical mixture, such as a mixture of elements or isotopes, or a mixture of radioactive matter and nonradioactive matter, or any other mixture requiring separation.

Once a rotating multi-species plasma 16 is established in the chamber 14, an electromagnetic wave having the specific characteristics described above is launched into the chamber 14 through end 32 to generate ponderomotive forces on the charged particles of the multi-species plasma 16. Under the influence of the ponderomotive forces generated by the antenna 30, high-mass ions 22 and electrons 20 will be directed towards the end 40 of the separator 10. On the other hand, low-mass ions 24 will be directed toward the end 32 of the separator 10. As indicated by the mathematical equations given above, under the influence of the ponderomotive forces, about one-half (½) of the low-mass ions 24 and all of the high-mass ions 22 will exit the chamber 14 through the end 40, leaving only low-mass ions 24 in the chamber 14. If the desired product is segregated high-mass ions 22, the low-mass ions 24 and high-mass ions 22 exiting the chamber 14 can be reintroduced as feed material into the separator 10 for additional separation. This process can be repeated as required to obtain the desired purity of high-mass ions 22.

For some separation applications, it is preferable to use an electromagnetic wave having frequency, ω. In this case, the density of light ions in the multi-species plasma 16 is controlled to be less than $n_e/2$, where $n_e$ is the density of electrons 20 in the multi-species plasma 16, to ensure that the electromagnetic wave is evanescent in the plasma. In other applications, such as when collisional effects are anticipated (i.e. at high plasma densities), a frequency, ω, for the electromagnetic wave is preferably chosen to be closer in magnitude to $\Omega_l$ than to $\Omega_h$ to avoid power dissipation in the wave.

While the particular Plasma Mass Separator using Ponderomotive Forces as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for separating ions of a multi-species plasma in a plasma chamber using ponderomotive forces which comprises:

means for generating a substantially uniform magnetic field in the plasma chamber, said magnetic field having a magnitude B and a direction;

means for introducing said multi-species plasma into said plasma chamber, said multi-species plasma including ions of a relatively high-mass charge ratio ($M_h$) having a cyclotron frequency ($\Omega_h$) and ions of a relatively low-mass charge ratio ($M_l$) having a cyclotron frequency ($\Omega_l$);

an antenna for propagating an electromagnetic wave into the plasma chamber substantially in the direction of said magnetic field;

means for rotating the electromagnetic wave at a frequency ω with a left-hand polarized mode relative to the electron gyration; and means for tuning said frequency ω of the electromagnetic wave, with $\Omega_h<\omega<\Omega_l$, to establish an evanescence of the electromagnetic wave in the multi-species plasma and generate respective oppositely directed ponderomotive forces on said ions $M_h$ and $M_l$ for separating said ions from each other.

2. A device as recited in claim 1 wherein $\omega=\frac{1}{2}[\Omega_h+\Omega_l]$.

3. A device as recited in claim 2 wherein the density of electrons in said multi-species plasma is $n_e$ and wherein the density of said ions of relatively low-mass to charge ratio in said multi-species plasma is less than $n_e/2$.

4. A device as recited in claim 1 wherein ω is closer in magnitude to $\Omega_l$, than to $\Omega_h$.

5. A device for separating ions of a multi-species plasma in a plasma chamber using ponderomotive forces, said device comprising:

means for generating a magnetic field in said plasma chamber;

means for introducing said multi-species plasma into said plasma chamber, said multi-species plasma including ions of relatively high-mass to charge ratio having a cyclotron frequency ($\Omega_h$) and ions of relatively low-mass to charge ratio having a cyclotron frequency ($\Omega_l$); and means for launching an electromagnetic wave that is evanescent in the multi-species plasma into the plasma chamber, said electromagnetic wave being left-hand elliptically polarized and having a frequency, ω, with $\Omega_h<\omega<\Omega_l$, to generate respective oppositely directed ponderomotive forces on said ions of relatively high-mass to charge ratio and said ions of relatively low-mass to charge ratio for separating said ions of relatively low-mass to charge ratio from said ions of relatively high-mass to charge ratio.

6. A device as recited in claim 5 wherein the E vector of said elliptically polarized electromagnetic wave rotates in the opposite direction as the electron orbits in said magnetic field.

7. A device as recited in claim 5 wherein said magnetic field is uniform in said plasma chamber and is oriented substantially parallel to a direction, and wherein said elliptically polarized electromagnetic wave is launched in a direction parallel to said magnetic field.

8. A device as recited in claim 5 wherein said means for launching an elliptically polarized electromagnetic wave into said plasma chamber is an antenna.

9. A device as recited in claim 5 wherein said means for launching an elliptically polarized electromagnetic wave into said plasma chamber comprises a cylindrical waveguide.

10. A device as recited in claim 5 wherein said elliptically polarized electromagnetic wave is a circularly polarized electromagnetic wave.

11. A device as recited in claim 5 wherein $\omega=\frac{1}{2}[\Omega_h+\Omega_l]$.

12. A device as recited in claim 11 wherein the density of electrons in said multi-species plasma is $n_e$ and wherein the density of said ions of relatively low-mass to charge ratio in said multi-species plasma is less than $n_e/2$.

13. A device as recited in claim 5 wherein ω is closer in magnitude to $\Omega_l$ than to $\Omega_h$.

* * * * *

UNITED STATES PATENT AND TRADEMARK OFFICE

CERTIFICATE OF CORRECTION

PATENT NO. : 6,585,891 B1
DATED : July 1, 2003
INVENTOR(S) : Tihiro Ohkawa

It is certified that error appears in the above-identified patent and that said Letters Patent is hereby corrected as shown below:

Column 2,
Line 27, delete "$\neq$" insert -- $\Omega$ --

Column 3,
Line 40, delete "X" insert -- $\lambda$ --

Column 4,
Line 15, delete "$[-\omega t+kz\ ]$." insert -- $[-i\omega t+kz]$. --
Line 30, delete "$|\Omega|$" insert -- $|\Omega_e|$ --

Signed and Sealed this

Seventh Day of October, 2003

JAMES E. ROGAN
*Director of the United States Patent and Trademark Office*